Sept. 21, 1965 TAKAHIKO FUKINUKI 3,207,851

TRANSMISSION SYSTEM FOR PULSE-CODE-MODULATED SIGNALS

Filed Nov. 14, 1962 2 Sheets-Sheet 2

United States Patent Office 3,207,851
Patented Sept. 21, 1965

3,207,851

TRANSMISSION SYSTEM FOR PULSE-CODE-MODULATED SIGNALS

Takahiko Fukinuki, Kitatama-gun, Tokyo-to, Japan, assignor to Kabushiki Kaisha Hitachi Seisakusho, Marunouchi, Chiyoda-ku, Tokyo-to, Japan, a joint-stock company of Japan Filed Nov. 14, 1962, Ser. No. 237,697
Claims priority, application Japan, Nov. 17, 1961, 36/41,263
3 Claims. (Cl. 179—15)

This invention relates to the transmission of pulse-code-modulated signals (hereinafter referred to as P.C.M. signals), and more particularly it relates to a new code system for P.C.M. signals having highly advantageous features.

In conventional automatic-telephone switching systems only the loop signaling necessary for switching is transmitted, at a high frequency level substantially different from that of speech, through the common transmission line. For this reason, the signals which are transmitted to the receiving station for the aforesaid signaling have heretofore been merely an "on-hook" signal (signifying that the loop is open) or an "off-hook" signal (signifying that the loop is closed), and the receiving station has merely been required to detect such information as call origination, dial impulse, minimum pause, and hang-up according to the time duration of these signals.

Moreover, the above-described situation is about the same in the case of electronic space-division switching systems or pulse-amplitude-modulation (P.A.M.) switching systems. A great disadvantage associated with conventional switching systems has been the difficulty of making use of advanced connecting systems because of the extreme simplicity of the signaling operation as afore-described.

Yet, by accomplishing automatic switching by means of a pulse-code-modulation system, substantial advantages can be gained on such parameters as signal-to-noise ($S/N$) ratio and cross-talk, and, as a further significant feature, the transmission of signaling or various call numbers which have been coded into exactly the same form as P.C.M. speech signals on the same transmission line becomes easy.

It is an object of the present invention to provide a new and improved code system for P.C.M. signals whereby various complex signalings and call numbers of subscribers or offices are transmitted to the receiving side through the same transmission line as that used for speech.

The foregoing object has been achieved by the present invention, which, as briefly described, provides a code system for P.C.M. signals, each of which is composed of a required number of bits and is used for transmission of P.C.M. speech which has been coded as well as for transmission of various signals, the slot or train of information bits being adapted to include a suitable number of bits used for indicating the content of the said slot.

The nature, principle, and details of the invention will be more clearly apparent by reference to the following description when taken in conjunction with the accompanying illustrations in which.

Figure 1:
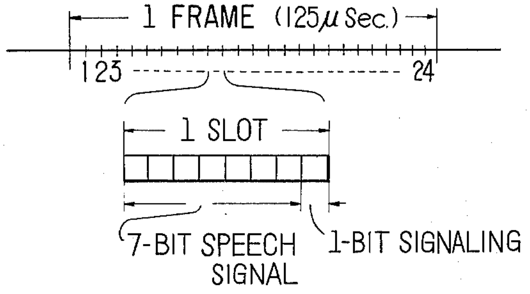
FIG. 1 is a diagram graphically representing one example of a conventional code system for P.C.M. signals.

In the construction of codes accomplished in a P.C.M.

system of presently known type as, for example, that indicated in FIG. 1, speech is sampled at a frequency of 8 kilocycles per second, this sampling period of 125 microseconds is taken as one frame, this frame is further divided into 24 equal parts, and each part is taken as one slot. As shown in FIG. 1, each slot is composed of 8 bits, of which 7 bits are allotted to speech (conversation voice signal), and the remaining one bit is allotted to signaling. For this reason, the sending of merely the information of, for example, "on-hook" or "off-hook" including dial impulses to the receiving side is possible.

However, during the transmission, control signaling is particularly required at the time of connection or disconnection, and at this time, speech is not required. Even if, as a supposition, a signal produced by sampling speech at 8 kilocycles and coding is replaced by signaling on rare occasions during speech transmission, such replacement would not impart an especially detrimental effect on the speech quality. (For example: the introduction of a signal instructing coin registration once in a period of from several seconds to several minutes.)

In view of the above considerations, the present invention has evolved from an improvement and development of the conventional P.C.M. transmission as described above.

Figure 2:
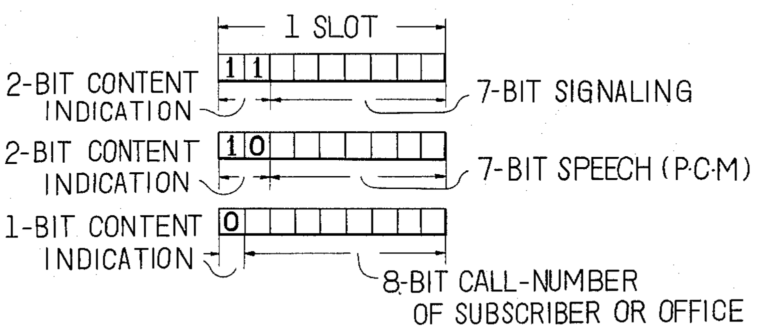
FIG. 2 is a time-division diagram indicating one embodiment of the present invention.

For example, as indicated by one embodiment illustrated in FIG. 2, each slot is composed of 9 bits, the two first bits of the said slot are used for indicating the content of the succeeding 7 bits, and the said succeeding 7 bits are used for signaling or speech; a single first bit can be used to indicate that the train contains the call number (eight successive bits) of a subscriber or office.

Figure 3:
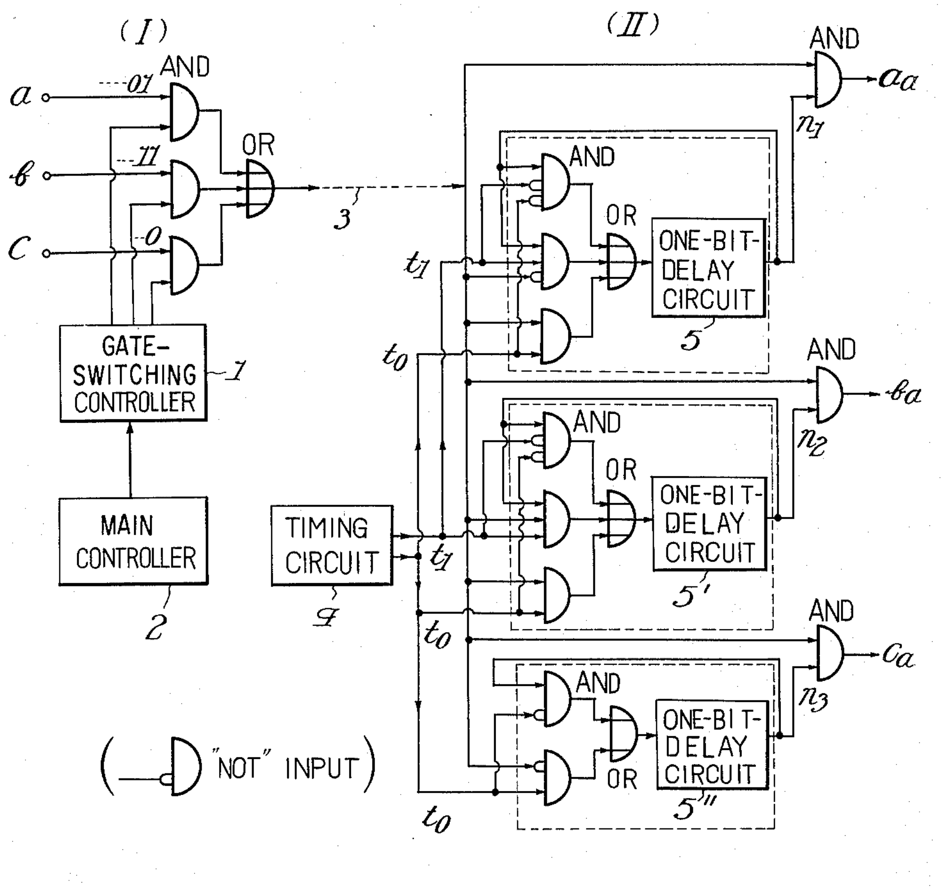
FIG. 3 is a schematic diagram illustrating one example of a transmission system suitable for use with the code system according to the invention.

An example of a system suitable for utilization of the code system of this invention is shown by the schematic diagram of FIG. 3. This system comprises, essentially: a gate-switching controller 1; a main controller 2; a transmission line 3; a timing circuit 4; bit-delay circuits 5; input terminals $a$, $b$, and $c$; output terminals $a_a$, $b_a$, $c_a$; And gates AND; and Or gates OR. The essential signals are: pulse signal $t_0$ which is synchronized with the first bit of the signal indicating the content within the aforementioned one slot; pulse signal $t_1$ which is synchronized with the next one bit; and gate signals $n_1$, $n_2$, and $n_3$. When speech is to be transmitted over the telephone line, the P.C.M. speech transmission is applied at input $a$ to the upper AND-gate of the transmission station I illustrated in FIG. 3. The controller 1 switches this AND-gate after previous switching of the lower AND-gate in any desired order whereby the output of the AND-gate is communicated to the OR-gate and via the transmission-line means 3 to the receiving station II. Similarly, telephone-line-control signals applied to input $b$ and the subscriber number signal applied to input $c$ are fed in respective slots through the OR-gate of the transmitting station I in the predetermined order. An initial bit representative of the content of the respective slot at the respective AND-gate is indicated by the bits shown adjacent these AND-gates above the line representative of the respective inputs.

At the receiving station II the bits are applied to the output AND-gates $n_1$, $n_2$, $n_3$, in parallel, and to first, second and third logic circuits responsive to speech signals, telephone-line-control signals and subscriber-number signals, respectively. The timing pulse $t_0$ produced by the timing circuit 4 is communicated to the logic circuits and, in accordance with the initial bits of the signal slot received, a delay circuit 5 is energized to operate the respective AND-gate $n_1$, $n_2$ or $n_3$ and transmit the respective train of bits via outputs $a_a$, $b_a$ and $c_a$. The delay circuits 5 withhold energization of the last-mentioned AND-gates by a period identical to the duration of the initial bit so that only the significant signals are transmitted via these AND-gates. When two bits are supplied at the beginning of each slot to direct the slots to their respective receiving channels, an additional timing signal $t_1$ is provided so that the respective delay circuits can be triggered twice to insure a two-bit delay and the passage of only the pertinent signals. The afore-mentioned essential components of the system are so connected and adapted to accomplish the operation described below.

When, on the transmitting side (I), coded P.C.M. speech is applied to the input terminal $a$, various signalings are applied to the input terminal $b$, and the call number of a subscriber or office is applied to the input terminal $c$, the gate switching controller 1 is driven by the main controller 2, and gate switching signals are sent to the respective AND gates in appropriate order according to the bit-order program established by the main controller 2, whereby the logical products of the gate switching signals and the respective aforesaid input signals is produced, and the input signal determined by the aforesaid program is transmitted from the "OR" gate to the receiving side (II), On the receiving side (II), these signals should be classified into P.C.M. speech, controlling signals and number, according to the contents of the aforementioned initial bits. To recognize the contents of the said initial bits, there should be provided logical circuits within the intermittent-line enclosures, each of which is composed of AND gates, an OR gate and bit-delay circuits responsive to the contents of the initial bits, whereby logical operation of each of the above-mentioned circuits is accomplished. For example, if a P.C.M. signal O which indicates content as the number arrives at the receiving station (II) at the time of $t_0$, only the one-bit delay circuit 5'' is activated and held until the following slot is ended, and the call number is gated out to $c_a$ gated by the output of the one-bit-delay circuit 5'', which is $n_3$. As a result, the afore-mentioned speech, signalings, and the call number of a subscriber or office are produced at the output terminals $a_a$, $b_a$, and $c_a$, respectively.

While in the foregoing disclosure, the case of a serial P.C.M. system has been described, the same objects can be achieved also in the case of a parallel P.C.M. system with an even simpler circuit.

By the application of the code system according to this invention, in a multistage connection or a toll exchange, various complex signalings can be transmitted through the use of the same transmission line as that for transmission of speech. Accordingly, the provision of a special control line is unnecessary. For example, it is possible to use, immediately, the transmission line which has been connected for the purpose of signaling at the time of connection, for P.C.M. speech from call origination. Moreover, this transmission line used for speech, in its original state, can be used as a line for signalling also for disconnection.

Furthermore, the system of this invention can be utilized not only for transmission of inter-office signals but also for transmitting and receiving signals during exchange within an office. Moreover, the system of this invention has possibility of application to various and useful purposes such as data transmission.

Figure 4:
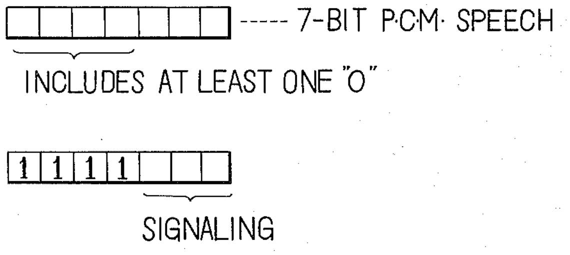
FIG. 4 is a diagram indicating a special case of the code system according to the invention.

The code system according to this invention need not be limited to the use of only a slot composed of 9 bits as shown in FIG. 2 but may have other arrangements as illustrated by the special cases of the invention shown in FIG. 4.

Since it is obvious that many changes and modifications can be made in the above described details without departing from the nature and spirit of the invention, it is to be understood that the invention is not to be limited to the details described herein except as set forth in the appended claims.

What is claimed is:

1. A telephonic transmission system for pulse-code-modulated signals for use with an automatic exchange, said system comprising at least one transmitting station, at least one receiving station and transmission-line means interconnecting said stations, said transmitting station comprising first, second and third inputs respectively energizable with signals representative of transmittable speech, telephone-circuit-control directions and a subscriber number to be contacted, said signals being applied to said input in subsequent bits with a predetermined number of bits in sequence constituting a signal slot, first, second and third AND-gating means respectively connected to each of said inputs, switching means for selectively energizing said AND-gating means in predetermined sequence for communicating the respective slots of signals to said transmission-line means while adding at least one initial bit to each slot in accordance with the AND-gating means energized for directing the respective slot into an appropriate channel of said receiving station, and OR-gating means supplied with the output with each of said AND-gating means for feeding the respective signal slots thereof in predetermined sequence to said transmission-line means; said receiving station being provided with a plurality of logic circuits corresponding to said channels and each being associated with a respective one of the signals representative of transmittable speech, telephone circuit control directions and a subscriber number to the contacted, timing means for transmitting to each of said logic circuits a timing pulse and operable in dependence upon said at least one initial bit in each signal slot for energizing the respective logic circuit, and delay means connected with each of said logic circuits and energizable upon energization of a respective logic circuit for permitting the transmission of the bits of the respective signal slot subsequent to said at least one bit.

2. A telephonic transmission system as defined in claim 1, further comprising additional AND-gating means respectively associated with each of said logic circuits and connected with said transmission-line means while being respectively energizable by the delay means of said logic circuits for transmitting the subsequent bits of each slot, said delay means being effective for a time period substantially equal to that of said at least one bit of each slot.

3. A telephonic transmission system for pulse-code-modulated signals, comprising a transmitting station, a multi-channel receiving station and transmission-line means interconnecting said stations, said transmitting station having at least three gates each provided with a respective input for energization by pulse-code-modulated signals of different purpose, and gate-control means for operating said gates in a predetermined pattern to supply said transmission-line means with signal slots of information bits adapted to be directed along two respective channels to said receiving station, while adding to each of said slots initial bits representative of the gate through which the slot was passed to said transmission-line means; said receiving station having a plurality of said channels each provided with a respective gate supplied with the slots carried by said transmission-line means, respective delay means operable upon energization to apply a signal to the respective gate of each channel to pass the slots received thereby, and timing means coupled with said delay means for energizing the latter to trigger the respective gate for passage of a respective slot only after a period of time equivalent to the number of initial bits carried by each slot.

References Cited by the Examiner

UNITED STATES PATENTS 3,083,267 3/63 Weller ________________ 179—15

DAVID G. REDINBAUGH, *Primary Examiner.*